US007923415B2

(12) United States Patent
Panga et al.

(10) Patent No.: US 7,923,415 B2
(45) Date of Patent: Apr. 12, 2011

(54) METHODS TO REDUCE SETTLING RATE OF SOLIDS IN A TREATMENT FLUID

(75) Inventors: Mohan K. R. Panga, Stafford, TX (US); Bruno Drochon, Houston, TX (US); Isabelle Couillet, Kuala Lumpur (MY); Juan-Carlos Santamaria, Houston, TX (US); Peter J. Photos, Houston, TX (US); John W. Still, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 24 days.

(21) Appl. No.: 12/551,081

(22) Filed: Aug. 31, 2009

(65) Prior Publication Data

US 2011/0053813 A1 Mar. 3, 2011

(51) Int. Cl.
*C09K 8/68* (2006.01)
*C09K 8/60* (2006.01)
*E21B 43/16* (2006.01)

(52) U.S. Cl. ...................... 507/203; 166/305.1; 507/103; 507/117; 507/219; 507/260

(58) Field of Classification Search .................. 507/203, 507/103, 117, 219, 260; 166/305.1
See application file for complete search history.

(56) References Cited

U.S. PATENT DOCUMENTS

| 2,905,245 | A |   | 9/1959  | De Priester       |
|-----------|---|---|---------|-------------------|
| 3,434,540 | A |   | 3/1969  | Stein             |
| 4,387,769 | A |   | 6/1983  | Erbstoesser et al.|
| 4,526,695 | A |   | 7/1985  | Erbstoesser et al.|
| 4,606,407 | A | * | 8/1986  | Shu ............... 166/270 |
| 5,095,987 | A |   | 3/1992  | Weaver et al.     |
| 5,492,178 | A |   | 2/1996  | Nguyen et al.     |
| 5,518,996 | A |   | 5/1996  | Maroy et al.      |
| 5,979,557 | A |   | 11/1999 | Card et al.       |
| 6,435,277 | B1 |  | 8/2002  | Qu et al.         |
| 6,656,265 | B1 |  | 12/2003 | Garnier et al.    |
| 6,742,590 | B1 |  | 6/2004  | Nguyen            |
| 6,874,578 | B1 |  | 4/2005  | Garnier et al.    |
| 7,237,610 | B1 |  | 7/2007  | Saini et al.      |
| 7,261,157 | B2 |  | 8/2007  | Nguyen et al.     |
| 7,265,079 | B2 |  | 9/2007  | Willberg et al.   |
| 7,267,170 | B2 |  | 9/2007  | Mang et al.       |
| 7,482,311 | B2 |  | 1/2009  | Willberg et al.   |
| 7,559,369 | B2 |  | 7/2009  | Roddy et al.      |
| 2003/0134751 | A1 | | 7/2003 | Lee et al.        |
| 2004/0152601 | A1 | | 8/2004 | Still et al.      |
| 2004/0261995 | A1 | | 12/2004 | Nguyen et al.    |
| 2004/0261996 | A1 | | 12/2004 | Munoz, Jr. et al.|
| 2005/0161220 | A1 | | 7/2005 | Todd et al.       |
| 2005/0252659 | A1 | | 11/2005 | Sullivan et al.  |
| 2006/0175059 | A1 | | 8/2006 | Sinclair et al.   |
| 2007/0238623 | A1 | | 10/2007 | Saini et al.     |
| 2009/0025932 | A1 | | 1/2009 | Panga et al.      |
| 2009/0025934 | A1 | | 1/2009 | Hartman et al.    |

FOREIGN PATENT DOCUMENTS

| EP | 1236701    | 9/2009  |
|----|------------|---------|
| GB | 2277543    | 11/1994 |
| WO | 2004038176 | 5/2004  |

* cited by examiner

*Primary Examiner* — Timothy J. Kugel
(74) *Attorney, Agent, or Firm* — Martin Rzaniak; David Cate; Robin Nava (57) ABSTRACT

The invention discloses a method of treating a subterranean formation of a well bore: providing a treatment fluid made of: a fluid; a particulate material, and a viscosifier material; wherein the viscosifier material is inactive in a first state and is able to increase viscosity of the treatment fluid when in a second state; introducing the treatment fluid into the wellbore; and providing a trigger able to activate the viscosifier material from first state to second state.

51 Claims, 5 Drawing Sheets

METHODS TO REDUCE SETTLING RATE OF SOLIDS IN A TREATMENT FLUID

FIELD OF THE INVENTION

The invention relates to methods for treating subterranean formations. More particularly, the invention relates to methods for reducing the settling rate of particulate material in a fluid.

BACKGROUND

The statements in this section merely provide background information related to the present disclosure and may not constitute prior art.

Hydrocarbons (oil, condensate, and gas) are typically produced from wells that are drilled into the formations containing them. For a variety of reasons, such as inherently low permeability of the reservoirs or damage to the formation caused by drilling and completion of the well, the flow of hydrocarbons into the well is undesirably low. In this case, the well is "stimulated" for example using hydraulic fracturing, chemical (usually acid) stimulation, or a combination of the two (called acid fracturing or fracture acidizing).

In hydraulic and acid fracturing, a first, viscous fluid called the pad is typically injected into the formation to initiate and propagate the fracture. This is followed by a second fluid that contains a proppant to keep the fracture open after the pumping pressure is released. Granular proppant materials may include sand, ceramic beads, or other materials. In "acid" fracturing, the second fluid contains an acid or other chemical such as a chelating agent that can dissolve part of the rock, causing irregular etching of the fracture face and removal of some of the mineral matter, resulting in the fracture not completely closing when the pumping is stopped. Occasionally, hydraulic fracturing can be done without a highly viscosified fluid (i.e., slick water) to minimize the damage caused by polymers or the cost of other viscosifiers.

In gravel packing, gravel is placed in the annulus of screen and formation/casing to control sand production. A carrier fluid is used to transport gravel from the surface to the formation where the gravel has to be placed. Typically two types of carrier fluids are used. The first is a brine with a low concentration of gravel (1 lb per gal of brine) and the second is a viscous fluid with high concentration of gravel (5 lb per gal of brine). Several types of viscosifiers are used to increase the viscosity of the fluid. These include polymers such as HEC, Xanthan, Guar etc and viscoelastic surfactants.

The transport of solids (proppant, gravel, or other particulate material) from the surface to the required depth in the well plays an important role in well stimulations. A common problem that occurs during solids transport is the setting of solids due to difference in densities of the fluid and the solid particles. If the solids start settling before the fluid reaches its destination, several problems can occur including screen outs, incomplete gravel packs, wellbore blockage, stuck tools etc. To reduce the settling rate, the carrier fluid is typically viscosified using polymers or surfactants. However, increasing the viscosity of the fluid at the surface can increase the friction pressure significantly.

Methods disclosed herewith offer a new way to viscosify the fluid while it is under downhole conditions.

SUMMARY

In a first aspect, a method of treating a subterranean formation of a well bore is disclosed: providing a treatment fluid made of: a fluid; a particulate material, and a viscosifier material; wherein the viscosifier material is inactive in a first state and is able to increase viscosity of the treatment fluid when in a second state; introducing the treatment fluid into the wellbore; and providing a trigger able to activate the viscosifier material from first state to second state. The treatment fluid may further have a degradable particulate material.

In a second aspect, a method of reducing the settling rate of a treatment fluid with a particulate material is disclosed: providing the treatment fluid made of the particulate material; providing a viscosifier material in the treatment fluid; providing a trigger able to activate the viscosifier material to increase viscosity of the treatment fluid such that the settling rate of the particulate material in the treatment fluid is reduced. The treatment fluid may further have a degradable particulate material.

In a third aspect, a method of avoiding the settling rate of a treatment fluid with a particulate material and a degradable material is disclosed: providing the treatment fluid made of the particulate material and the degradable material; providing a viscosifier material in the treatment fluid; providing a trigger able to activate the viscosifier material to increase viscosity of the treatment fluid when the degradable material dissolved in the treatment fluid, such that the settling rate of the particulate material in the treatment fluid is unchanged. In certain embodiments, the fluid is a carrier fluid and/or the particulate material is proppant.

The treatment fluid may further have a degradable particulate material. In one embodiment, the particulate material has a first average particle size and the degradable particulate material has a second average particle size, wherein the second average particle size is between three to twenty times smaller than the first average particle size. The second average particle size may be between five to ten times smaller than the first average particle size. In a second embodiment, the degradable particulate material has further an amount of particulates having a third average particle size, wherein the third average particle size is between three to twenty times smaller than the second average particle size. The third average particle size may be between five to ten times smaller than the second average particle size.

In one alternative, the trigger may be temperature. The viscosifier material may be a polysaccharide polymer.

In a second alternative, the trigger is pH, triggered by acid or basic condition. The viscosifier material may be an acid soluble polymer which increases viscosity of the treatment fluid when in acid pH. The acid soluble polymer may be chitosan, chitosan derivative, polyimide, copolymer of vinyl pyridine, copolymer of acrylic and/or methacrylic acid or a mixture thereof. The treatment fluid may further have an acid precursor and the step of providing the trigger is done by releasing acid from the acid precursor. The acid precursor can be encapsulated. The treatment fluid may further have an acid and the step of providing the trigger is done by releasing acid. The acid can be encapsulated. The treatment fluid may further have a degradable particulate material and the acid precursor would be the degradable particulate material. The viscosifier material may be a base soluble polymer which increases viscosity of the treatment fluid when in base pH. The base soluble polymer may be copolymer containing maleic anhydride, alkali swellable latex or a mixture thereof. The treatment fluid may further have a base precursor and the step of providing the trigger is done by releasing base from the base precursor. The base precursor can be encapsulated. The treatment fluid may further have a base and the step of providing the trigger is done by releasing base. The base can be encapsulated.

In a fourth aspect, a composition for use in a subterranean formation of a well bore is disclosed. The composition comprises: a fluid, a particulate material, and a viscosifier material; wherein the viscosifier material is inactive in a first state and is able to increase viscosity of the composition when in a second state stimulated by a trigger.

The composition may further comprise a degradable particulate material. In one embodiment, the particulate material has a first average particle size and the degradable particulate material has a second average particle size, wherein the second average particle size is between three to twenty times smaller than the first average particle size. The second average particle size may be between five to ten times smaller than the first average particle size. In a second embodiment, the degradable particulate material has further an amount of particulates having a third average particle size, wherein the third average particle size is between three to twenty times smaller than the second average particle size. The third average particle size may be between five to ten times smaller than the second average particle size.

In one alternative, the trigger may be temperature. The viscosifier material may be a polysaccharide polymer.

In a second alternative, the trigger is pH, triggered by acid or basic condition. The viscosifier material may be an acid soluble polymer which increases viscosity of composition when in acid pH. The acid soluble polymer may be chitosan, chitosan derivative, polyimide, copolymer of vinyl pyridine, copolymer of acrylic and/or methacrylic acid or a mixture thereof. The composition may further comprise an acid precursor or an acid. The acid precursor or acid can be encapsulated. The composition may further comprise a degradable particulate material and the acid precursor would be the degradable particulate material. The viscosifier material may be a base soluble polymer which increases viscosity of the composition when in base pH. The base soluble polymer may be copolymer containing maleic anhydride, alkali swellable latex or a mixture thereof. The composition may further comprise a base precursor or a base. The base precursor or base can be encapsulated

DETAILED DESCRIPTION

At the outset, it should be noted that in the development of any actual embodiments, numerous implementation-specific decisions must be made to achieve the developer's specific goals, such as compliance with system and business related constraints, which can vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating embodiments of the invention and should not be construed as a limitation to the scope and applicability of the invention. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range disclosed and enabled the entire range and all points within the range.

The following definitions are provided in order to aid those skilled in the art in understanding the detailed description.

The term "treatment", or "treating", refers to any subterranean operation that uses a fluid in conjunction with a desired function and/or for a desired purpose. The term "treatment", or "treating", does not imply any particular action by the fluid.

The term "fracturing" refers to the process and methods of breaking down a geological formation and creating a fracture, i.e. the rock formation around a well bore, by pumping fluid at very high pressures, in order to increase production rates from a hydrocarbon reservoir. The fracturing methods otherwise use conventional techniques known in the art.

Figure 1:
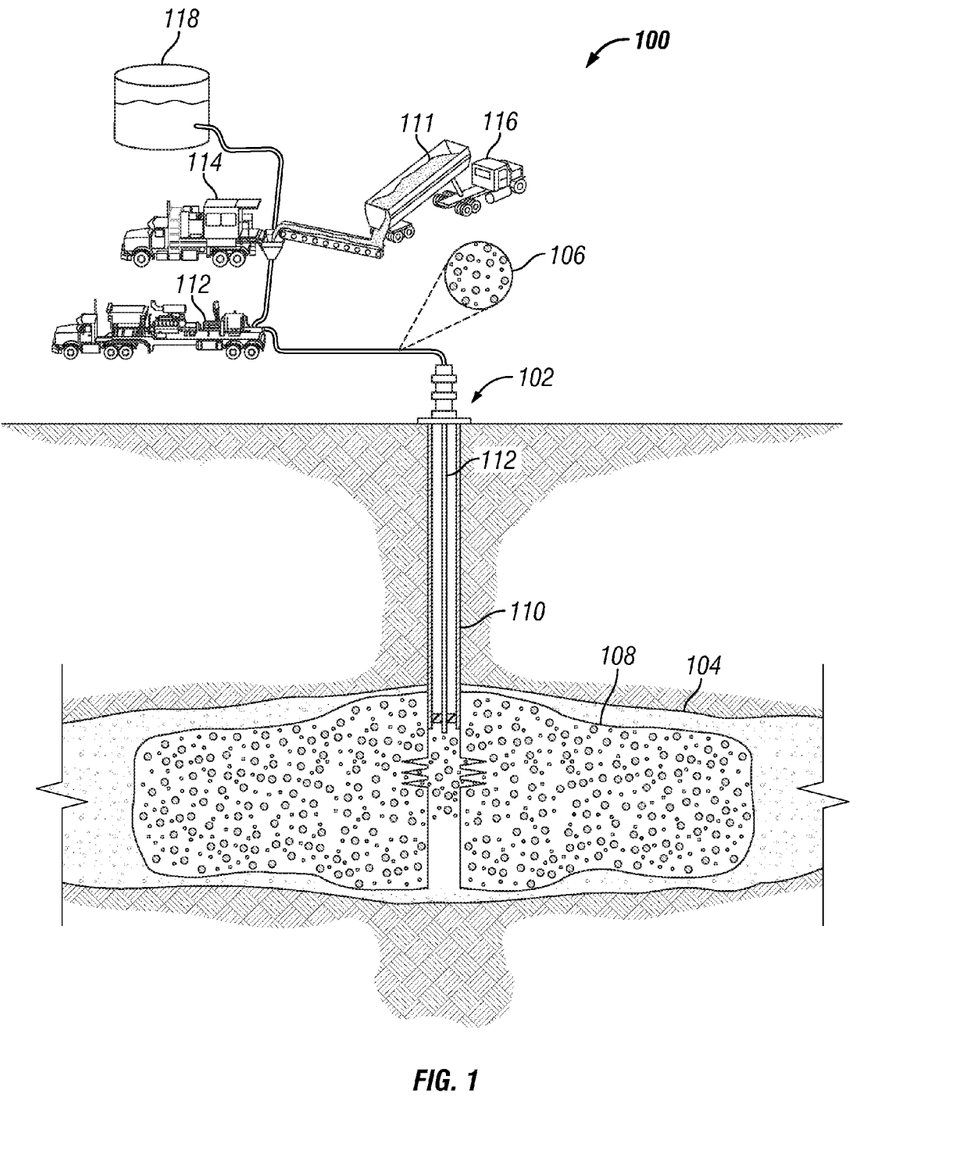
FIG. 1 shows an illustration of some embodiments.

FIG. 1 is a schematic diagram of a system 100 used in a method of reducing settling rate of a high solid content fluid. The system 100 includes a wellbore 102 in fluid communication with a formation of interest 104. The formation of interest 104 may be any formation wherein fluid communication between a wellbore and the formation is desirable, including a hydrocarbon-bearing formation, a water-bearing formation, a formation that accepts injected fluid for disposal, pressurization, or other purposes, or any other formation understood in the art.

The system 100 further includes a treatment fluid 106 that includes a fluid having optionally a low amount of a viscosifier. The treatment fluid can be embodied as a fracturing slurry wherein the fluid is a carrier fluid. The carrier fluid includes any base fracturing fluid understood in the art. Some non-limiting examples of carrier fluids include hydratable gels (e.g. guars, poly-saccharides, xanthan, hydroxy-ethyl-cellulose, etc.), a cross-linked hydratable gel, a viscosified acid (e.g. gel-based), an emulsified acid (e.g. oil outer phase), an energized fluid (e.g. an $N_2$ or $CO_2$ based foam), and an oil-based fluid including a gelled, foamed, or otherwise viscosified oil. Additionally, the carrier fluid may be a brine, and/or may include a brine. While the treatment fluid 106 described herein includes particulates, the system 100 may further include certain stages of fracturing fluids with alternate mixtures of particulates.

A low amount of viscosifier specifically indicates a lower amount of viscosifier than conventionally is included for a fracture treatment. The loading of the viscosifier, for example described in pounds of gel per 1,000 gallons of carrier fluid, is selected according to the particulate size (due to settling rate effects) and loading that the fracturing slurry must carry, according to the viscosity required to generate a desired fracture 108 geometry, according to the pumping rate and casing 110 or tubing 112 configuration of the wellbore 102, according to the temperature of the formation of interest 104, and according to other factors understood in the art. In certain embodiments, the low amount of the viscosifier includes a hydratable gelling agent in the carrier fluid at less than 20 pounds per 1,000 gallons of carrier fluid where the amount of particulates in the fracturing slurry are greater than 16 pounds per gallon of carrier fluid. In certain further embodiments, the low amount of the viscosifier includes a hydratable gelling agent in the carrier fluid at less than 20 pounds per 1,000 gallons of carrier fluid where the amount of particulates in the fracturing slurry are greater than 23 pounds per gallon of carrier fluid. In certain embodiments, a low amount of the viscosifier includes a visco-elastic surfactant at a concentration below 1% by volume of carrier fluid. In certain embodiments a low amount of the viscosifier includes values greater than the listed examples, because the circumstances of the system 100 conventionally utilize viscosifier amounts much greater than the examples. For example, in a high temperature application with a high proppant loading, the carrier fluid may conventionally indicate the viscosifier at 50 lbs of gelling agent per 1,000 gallons of carrier fluid, wherein 40 lbs of gelling agent, for example, may be a low amount of viscosifier. One of skill in the art can perform routine tests of fracturing slurries 106 based on certain particulate blends 111 in light of the disclosures herein to determine acceptable viscosifier amounts for a particular embodiment of the system 100.

In certain embodiments, the carrier fluid includes an acid. The fracture 108 is illustrated as a traditional hydraulic double-wing fracture, but in certain embodiments may be an etched fracture and/or wormholes such as developed by an acid treatment. The carrier fluid may include hydrochloric acid, hydrofluoric acid, ammonium bifluoride, formic acid, acetic acid, lactic acid, glycolic acid, maleic acid, tartaric acid, sulfamic acid, malic acid, citric acid, methyl-sulfamic acid, chloro-acetic acid, an amino-poly-carboxylic acid, 3-hydroxypropionic acid, a poly-amino-poly-carboxylic acid, and/or a salt of any acid. In certain embodiments, the carrier fluid includes a poly-amino-poly-carboxylic acid, and is a trisodium hydroxyl-ethyl-ethylene-diamine triacetate, mono-ammonium salts of hydroxyl-ethyl-ethylene-diamine triacetate, and/or mono-sodium salts of hydroxyl-ethyl-ethylene-diamine tetra-acetate. The selection of any acid as a carrier fluid depends upon the purpose of the acid—for example formation etching, damage cleanup, removal of acid-reactive particles, etc., and further upon compatibility with the formation 104, compatibility with fluids in the formation, and compatibility with other components of the fracturing slurry and with spacer fluids or other fluids that may be present in the wellbore 102.

In certain embodiments, the fracturing slurry includes particulate materials generally called proppant. Proppant involves many compromises imposed by economical and practical considerations. Criteria for selecting the proppant type, size, and concentration is based on the needed dimensionless conductivity, and can be selected by a skilled artisan. Such proppants can be natural or synthetic (including but not limited to glass beads, ceramic beads, sand, and bauxite), coated, or contain chemicals; more than one can be used sequentially or in mixtures of different sizes or different materials. The proppant may be resin coated, or pre-cured resin coated. Proppants and gravels in the same or different wells or treatments can be the same material and/or the same size as one another and the term proppant is intended to include gravel in this disclosure. In general the proppant used will have an average particle size of from about 0.15 mm to about 2.39 mm (about 8 to about 100 U.S. mesh), more particularly, but not limited to 0.25 to 0.43 mm (40/60 mesh), 0.43 to 0.84 mm (20/40 mesh), 0.84 to 1.19 mm (16/20), 0.84 to 1.68 mm (12/20 mesh) and 0.84 to 2.39 mm (8/20 mesh) sized materials. Normally the proppant will be present in the slurry in a concentration of from about 0.12 to about 0.96 kg/L, or from about 0.12 to about 0.72 kg/L, or from about 0.12 to about 0.54 kg/L.

In one embodiment, the treatment fluid 106 comprises particulate materials with defined particles size distribution. On example of realization is disclosed in U.S. publication number 2009-0025934, herewith incorporated by reference, for a treatment fluid being a fracturing slurry. The fracturing slurry may include a first amount of particulates having a first average particle size between about 100 and 2000 µm. In certain embodiments, the first amount of particulates may be a proppant, for example sand, ceramic, or other particles understood in the art to hold a fracture 108 open after a treatment is completed. In certain embodiments, the first amount of particulates may be a fluid loss agent, for example calcium carbonate particles or other fluid loss agents known in the art. The fracturing slurry may further include a second amount of particulates having a second average particle size between about three times and about ten times smaller than the first average particle size. For example, where the first average particle size is about 100 µm (an average particle diameter, for example), the second average particle size may be between about 5 µm and about 33 µm. In certain embodiments, the second average particle size may be between about seven and twenty times smaller than the first average particle size.

In a second embodiment, the selection of the size of the second amount of particulates is dependent upon maximizing the packed volume fraction (PVF) of the mixture of the first amount of particulates and the second amount of particulates. A second average particle size of between about five to ten times smaller than the first amount of particulates contributes to maximizing the PVF of the mixture, but a size between about three to ten times smaller, and in certain embodiments between about three to twenty times smaller, will provide a sufficient PVF for most systems. Further, the selection of the size of the second amount of particulates is dependent upon the composition and commercial availability of particulates of the type comprising the second amount of particulates. For example, where the second amount of particulates comprise wax beads, a second average particle size of four times (4×) smaller than the first average particle size rather than seven times (7×) smaller than the first average particle size may be used if the 4× embodiment is cheaper or more readily available and the PVF of the mixture is still sufficient to acceptably suspend the particulates in the carrier fluid.

In a third embodiment, the fracturing slurry further includes a third amount of particulates having a third average particle size that is smaller than the second average particle size. In this third embodiment the PVF of the mixture of the first amount of particulates, the second amount of particulates and the third amount of particulates may be optimized or maximized. A third average particle size of between about five to ten times smaller than the second amount of particulates contributes to maximizing the PVF of the mixture, but a size between about three to ten times smaller, and in certain embodiments between about three to twenty times smaller, will provide a sufficient PVF for most systems. In certain further embodiments, the fracturing slurry 106 may have a fourth or a fifth amount of particles. For the purposes of optimizing the PVF of the fracturing slurry 106, more than three or four particles sizes will not typically be required. Additional particles may be added for other reasons, such as the chemical composition of the additional particles, the ease of manufacturing certain materials into the same particles versus into separate particles, the commercial availability of particles having certain properties, and other reasons understood in the art.

In certain embodiments, the system 100 includes a pumping device 112 structured to create a fracture 108 in the formation of interest 104 with the slurry 106. The system 100 in certain embodiments further includes peripheral devices such as a blender 114, a particulates hauler 116, fluid storage tank(s) 118, and other devices understood in the art. In certain embodiments, the carrier fluid may be stored in the fluid storage tank 118, or may be a fluid created by mixing additives with a base fluid in the fluid storage tank 118 to create the carrier fluid. The particulates may be added from a conveyor 120 at the blender 114, may be added by the blender 114, and/or may be added by other devices (not shown). In certain embodiments, one or more sizes of particulates may be premixed into the particulate blend 111. For example, if the system 100 includes a first amount, second amount, and third amount of particulates, a particulate blend 111 may be premixed and include the first amount, second amount, and third amount of particulates. In certain embodiments, one or more particulate sizes may be added at the blender 114 or other device. For example, if the system 100 includes a first amount, second amount, and third amount of particulates, a particulate blend 111 may be premixed and include the first amount and second amount of particulates, with the third amount of particulates added at the blender 114.

In certain embodiments, the treatment fluid 106 includes a degradable material. In certain embodiments, the degradable material is making up at least part of the second amount of particulates. For example, the second amount of particulates may be completely made from degradable material, and after the fracture treatment the second amount of particulates degrades and flows from the fracture 108 in a fluid phase. In another example, the second amount of particulates includes a portion that is degradable material, and after the fracture treatment the degradable material degrades and the particles break up into particles small enough to flow from the fracture 108. In certain embodiments, the second amount of particulates exits the fracture by dissolution into a fluid phase or by dissolution into small particles and flowing out of the fracture.

The treatment fluid 106 includes a viscosifier material, inactive in a first state and able to increase the viscosity of the fracturing slurry 106 in a second state. The activation from the first state to the second state is made by a trigger. In certain embodiments, the trigger is pH or temperature. In other embodiments, the trigger may be salinity, pressure or other mechanical modification.

Figure 2:
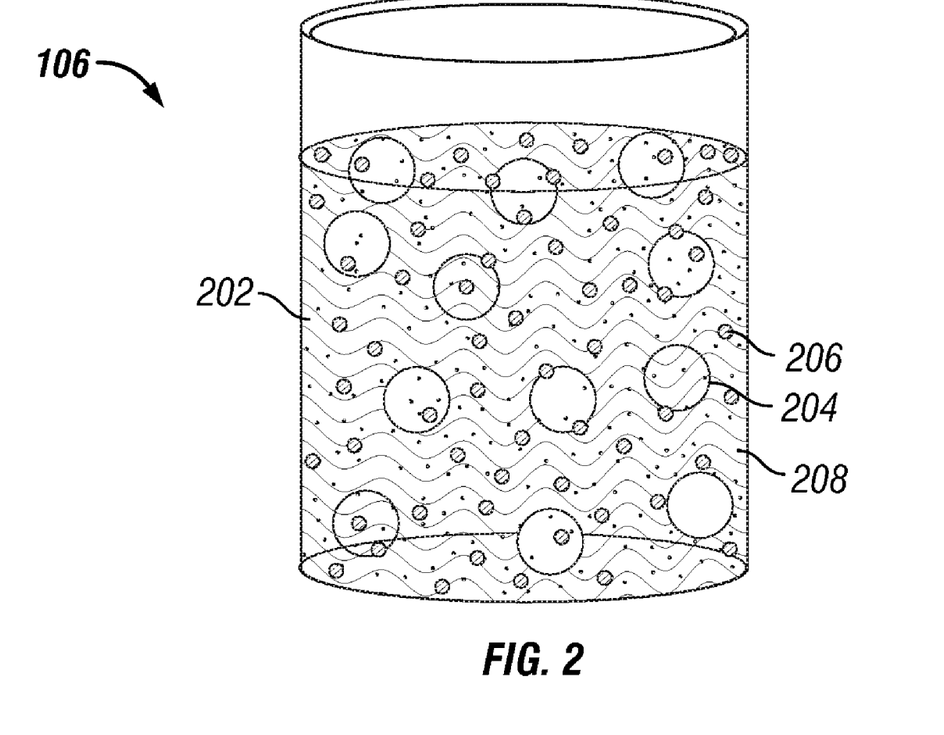
FIG. 2 shows treatment fluid to use some embodiments.

FIG. 2 is an illustration of a treatment fluid 106. The treatment fluid 106 includes a fluid 202, at least a first amount of particulate material 204 and at least a second amount of viscosifier material 208. In certain further embodiments the treatment fluid 106 further includes at least a third amount of degradable particulates 206. Optionally, the particulates are combined to optimize the PVF. In certain embodiments, the particulates 204, 206, 208 combine to have a PVF above 0.70 or above 0.80. In certain further embodiments the particulates 204, 206, 208 may have a much higher PVF approaching 0.95.

The degradable material 206 in certain embodiments comprises a wax, an oil-soluble resin, and/or a material soluble in hydrocarbons. In certain embodiments, the degradable material 206 includes at least one of a lactide, a glycolide, an aliphatic polyester, a poly(lactide), a poly(glycolide), a poly(ε-caprolactone), a poly(orthoester), a poly(hydroxybutyrate), an aliphatic polycarbonate, a poly(phosphazene), and a poly (anhydride). In certain embodiments, the degradable material includes at least one of a poly(saccharide), dextran, cellulose, chitin, chitosan, a protein, a poly(amino acid), a poly(ethylene oxide), and a copolymer including poly(lactic acid) and poly(glycolic acid). In certain embodiments, the degradable material includes a copolymer including a first moiety which includes at least one functional group from a hydroxyl group, a carboxylic acid group, and a hydrocarboxylic acid group, the copolymer further including a second moiety comprising at least one of glycolic acid and lactic acid.

Figure 3A:
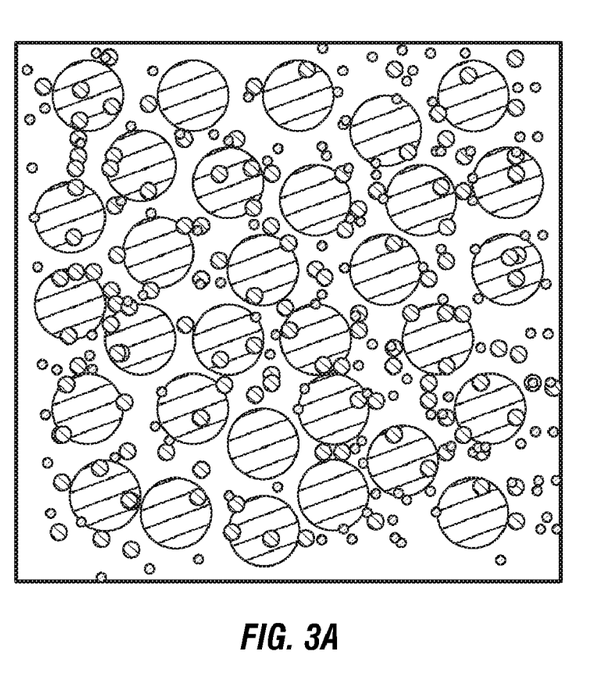
FIG. 3A shows a high solid fraction fluid.
Figure 3B:
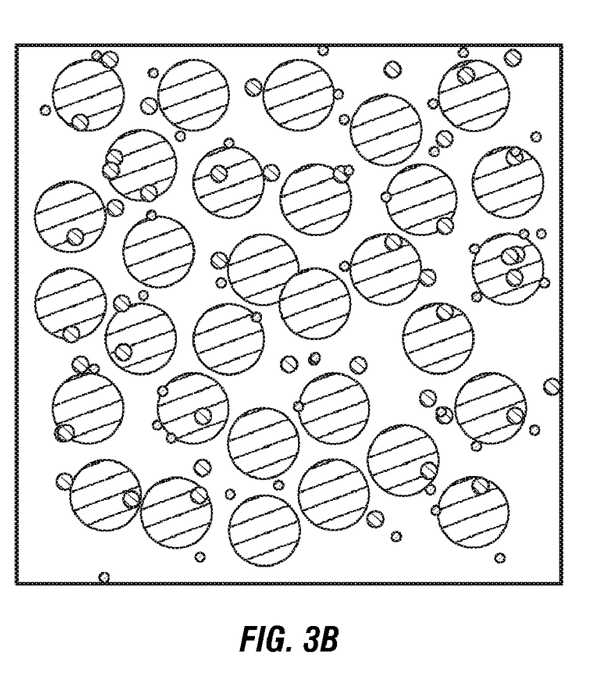
FIG. 3B shows a low solid fraction fluid.

The treatment fluid typically contains sand and degradable particles of different sizes, optionally having PVF optimized. FIG. 3A is an illustration of the treatment fluid according to one embodiment with a high solid fraction. The sand is suspended in solution due to hindered settling. The settling rate of sand is a function of the solid fraction in the slurry. For the sand to be suspended for a long period of time it is essential to have a high solid phase volume in the slurry. FIG. 3B is an illustration of the treatment fluid according to a second embodiment with a low solid fraction. This slurry shown will settle at a much faster rate than the slurry in previous embodiment.

One example of a high solid content fluid for the treatment fluid is: sand, polyglycolic acid (PGA) in water. The sand has an average particle size of 800 μm and is present at 48% in volume. The PGA is in two particle sizes: a first average particle size of 150 μm and a second average particle size of 8 μm. The first particle size is present at 8% in volume and the second particle size is present at 16% in volume. The deionized water is present at 29% in volume. The PVF of this treatment fluid is 0.71.

Figure 4A:
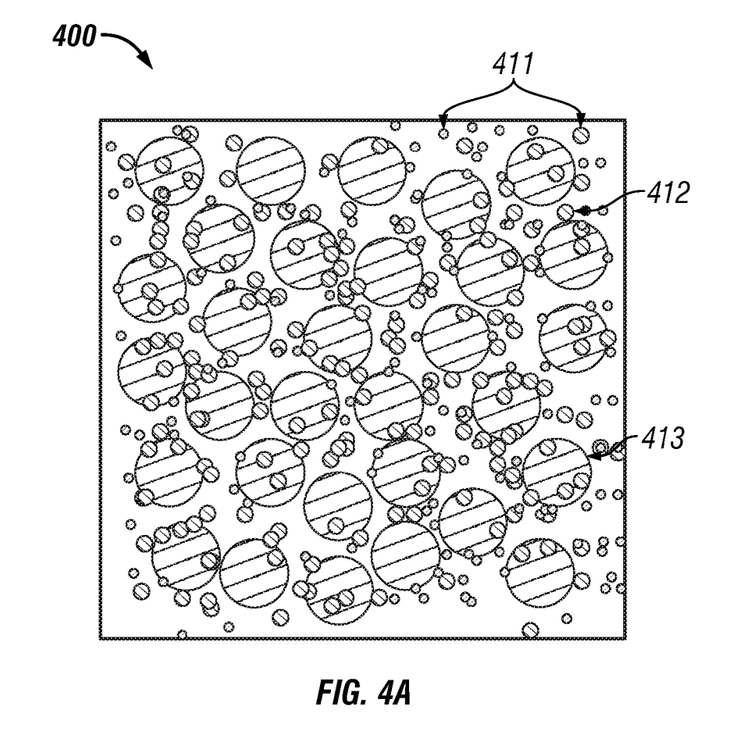
FIG. 4A shows a high solid fluid with a pH/temperature viscosifier material in the first state.
Figure 4B:
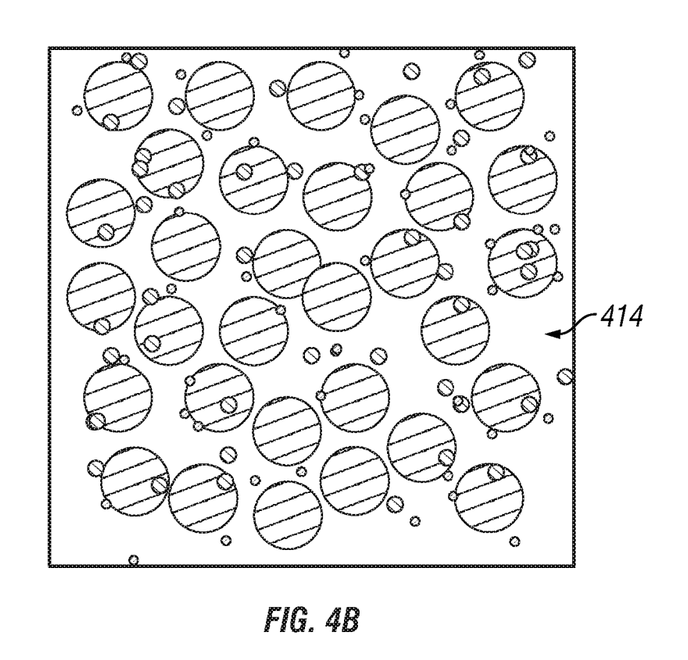
FIG. 4B shows the viscosifier material in the second state.

FIGS. 4A and 4B are an illustration of the mechanism of the method of treatment according to certain embodiments. After the treatment fluid or slurry 400 is place downhole, the degradable particles 411 turn into liquid state. This reduces the solid fraction in the slurry thereby accelerating the settling rate of sand. To reduce the settling rate of sand 413 once the slurry is placed downhole, the solution is viscosified using a pH or temperature triggered viscosifier material 412. As shown in FIG. 4A, pH or temperature triggered particles that increase viscosity when they dissolve are added to the treatment fluid. After the treatment fluid is placed downhole, the increase in settling rate due to decrease in solid volume fraction is compensated by the increase in viscosity of the solution from dissolution of the pH or temperature triggered viscosifier material. The viscosifier material goes from a first solid state 413 to a second liquid state 414. The pH triggered viscosifier material dissolves in water when PGA hydrolyzes and releases acid. If a temperature triggered viscosifier is used, the liquid phase viscosity increases as soon as the treatment fluid is placed downhole, thanks to increase of temperature between surface and downhole.

In a first embodiment, the viscosifier material is an acid soluble polymer which is added to the treatment fluid along with an acid precursor. The acid precursor can be one of the degradable particles in the slurry. The acid soluble polymer is in the form of a solid particle at surface conditions. As the acid soluble polymers are solid particles having an average particle size, they can be included in the optimization process of PVF. After the slurry is placed downhole, the acid precursor releases acid and changes the pH of the solution. The acid soluble polymer particles dissolve in the fluid increasing the viscosity of the fluid. Examples of acid soluble polymers include chitosan or chitosan derivatives such as the N-carboxybutyl chitosan or the N-carboxymethyl chitosan, polyimides such as the examples described in U.S. Pat. No. 6,379, 865 or 6,559,245, incorporated herewith by reference, copolymers of vinyl pyridine as those described in U.S. Pat. No. 7,294,347, incorporated herewith by reference, or copolymers of acrylic and/or methacrylic acid or mixture of those polymers.

In a second embodiment, the viscosifier material is an acid soluble polymer which is added to the treatment fluid along with an encapsulated acid or acid precursors. The acid soluble polymer is of the type as disclosed in first embodiment. The acid required for triggering the dissolution of the acid soluble polymer is added to the mixture as the encapsulated acid or acid precursors. The encapsulated acid or acid precursors release acid once the slurry reaches downhole. Examples include encapsulated PLA, PGA other hydroxy acids, citric, glycolic, maleic acid/anhydride etc. Encapsulated material can be a solid polymer acid precursor. Examples of solid polymer acid precursors that may be used include homopolymers of lactic acid, glycolic acid, hydroxybutyrate, hydroxyvalerate and epsilon caprolactone, random copolymers of at least two of lactic acid, glycolic acid, hydroxybutyrate, hydroxyvalerate, epsilon caprolactone, L-serine, L-threonine, L-tyrosine, block copolymers of at least two of polyglycolic acid, polylactic acid, hydroxybutyrate, hydroxyvalerate, epsilon caprolactone, L-serine, L-threonine, L-tyrosine, homopolymers of ethylenetherephthalate (PET), butylenetherephthalate (PBT) and ethylenenaphthalate (PEN), random copolymers of at least two of ethylenetherephthalate, butylenetherephthalate and ethylenenaphthalate, block copolymers of at least two of ethylenetherephthalate, butylenetherephthalate, ethylenenaphthalate and combinations of these. Some of the encapsulated material may include acrylics, halocarbon, polyvinyl alcohol, Aquacoat® aqueous dispersions, hydrocarbon resins, polyvinyl chloride, Aquateric® enteric coatings, hydroxypropyl cellulose (HPC), polyvinylacetate phthalate, hydroxypropyl methyl cellulose (HPMC), polyvinylidene chloride, hydroxylpropyl methyl cellulose phthalate (HPMCP), proteins, Kynar®, fluoroplastics, rubber (natural or synthetic), caseinates, maltodextrins, shellac, chlorinated rubber, silicone, polyvinyl acetate phthalate (e.g. Coateric®) coatings, microcrystalline wax, starches, coating butters, milk solids, stearines, polyvinyl dichloride (Daran®) latex, molasses, sucrose, dextrins, nylon, surfactants, Opadry® coating systems, Surelease® coating systems, enterics, paraffin wax, Teflon® fluorocarbons, Eudragits® polymethacrylates, phenolics, waxes, ethoxylated vinyl alcohol, vinyl alcohol copolymer, polylactides, zein, fats, polyamino acids, fatty acids, polyethylene gelatin, polyethylene glycol, glycerides, polyvinyl acetate, vegetable gums and polyvinyl pyrrolidone.

In a third embodiment, the viscosifier material is a base soluble polymer which is added to the treatment fluid along with a base precursor or a weak base. The slurry containing sand and base soluble polymer particles and the base precursor is injected to the formation. The base soluble polymer dissolves in the fluid because of increase in pH from the base precursor increasing the viscosity of the slurry. The sand settling rate is reduced and after the treatment the dissolved polymer particles create void spaces in the pack. Examples of base soluble polymers include copolymers containing maleic anhydride. One such example is a copolymer of maleic anhydride and isobutylene that is manufactured by Kuraray Company and is sold under the trade name of ISOBAM. Other examples include alkali swellable latex as described in U.S. publication number 2008/0190615, incorporated herewith by reference. Examples of pH increasing agents include urea and its derivatives, weak bases, hydroxides and oxides of alkali and alkaline earth metals, encapsulated bases that could be released into the fluid downhole.

In a fourth embodiment, the viscosifier material is polymer particle that dissolves at high temperature. The treatment fluid comprises sand, water/brine and polymer particles that dissolves at high temperature. The slurry is used to carry sand from the surface to a subterranean formation. After the sand reaches its destination, its settling rate is slowed down by the increase in viscosity resulting from the dissolution of polymer particles into the brine at high temperature. Examples of high temperature soluble polymer are polysaccharides such as locust bean, cellulose, sodium carboxymethyl cellulose, starch, konjac, agaroid and any derivatives of those materials.

In some embodiments, the treatment fluids may optionally further comprise additional additives, including, but not limited to, acids, fluid loss control additives, gas, corrosion inhibitors, scale inhibitors, catalysts, clay control agents, biocides, friction reducers, combinations thereof and the like. For example, in some embodiments, it may be desired to foam the treatment fluid using a gas, such as air, nitrogen, or carbon dioxide. In one certain embodiment, the treatment fluids may contain a particulate additive, such as a particulate scale inhibitor.

The treatment fluids may be used for carrying out a variety of subterranean treatments, including, but not limited to, drilling operations, fracturing treatments, and completion operations (e.g., gravel packing). In some embodiments, the treatment fluids may be used in treating a portion of a subterranean formation. In certain embodiments, a treatment fluid may be introduced into a well bore that penetrates the subterranean formation. Optionally, the treatment fluid further may comprise particulates and other additives suitable for treating the subterranean formation. For example, the treatment fluid may be allowed to contact the subterranean formation for a period of time. In some embodiments, the treatment fluid may be allowed to contact hydrocarbons, formations fluids, and/or subsequently injected treatment fluids. After a chosen time, the treatment fluid may be recovered through the well bore. In certain embodiments, the treatment fluids may be used in fracturing treatments.

The method is also suitable for gravel packing, or for fracturing and gravel packing in one operation (called, for example frac and pack, frac-n-pack, frac-pack, StimPac treatments, or other names), which are also used extensively to stimulate the production of hydrocarbons, water and other fluids from subterranean formations. These operations involve pumping a slurry of in hydraulic fracturing or gravel in gravel packing. In low permeability formations, the goal of hydraulic fracturing is generally to form long, high surface area fractures that greatly increase the magnitude of the pathway of fluid flow from the formation to the wellbore. In high permeability formations, the goal of a hydraulic fracturing treatment is typically to create a short, wide, highly conductive fracture, in order to bypass near-wellbore damage done in drilling and/or completion, to ensure good fluid communication between the rock and the wellbore and also to increase the surface area available for fluids to flow into the wellbore.

In certain embodiments, the treatment fluids may be used for providing some degree of sand control in a portion of the subterranean formation. In the sand control embodiments, the treatment fluid is introduced into the well bore that penetrates the subterranean formation such that the particulates form a gravel pack in or adjacent to a portion of the subterranean formation.

To facilitate a better understanding of the invention, the following examples of embodiments are given. In no way should the following examples be read to limit, or define, the scope of the invention.

EXAMPLES

A series of experiments were conducted to demonstrate method of treatment according to the invention.

Example 1

Figure 5:
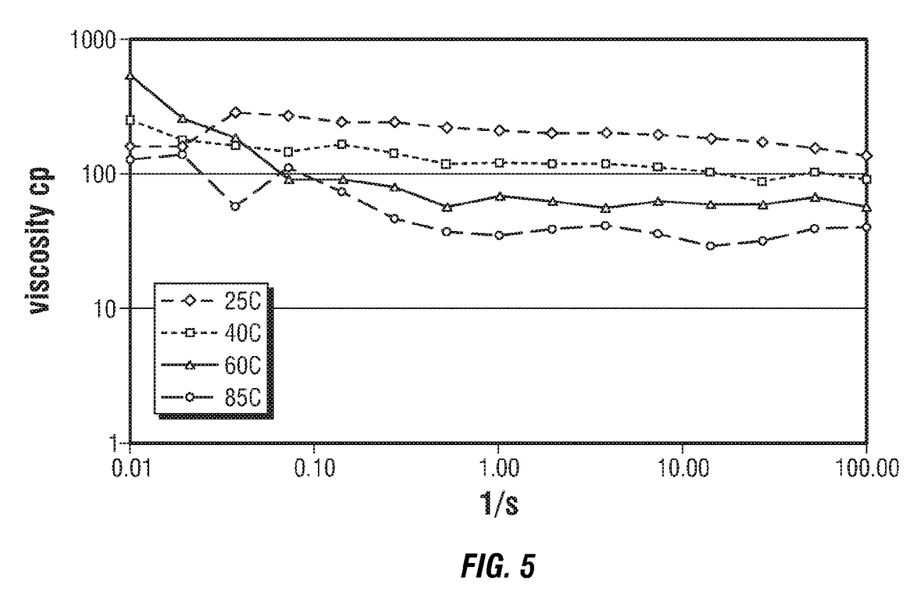
FIG. 5 shows viscosity profile of the viscosifier material in the second state for different temperatures.

Two mixtures containing 80 mL de-ionized (DI) water and 0.64 g of high molecular weight chitosan polymer particles were prepared. The pH of one of the mixtures was adjusted to pH=2.28 using glycolic acid. The bottles were heated in the oven at 65.5° C. (150° F.) for 45 min. The two mixtures were analyzed after heating under static conditions. It can be seen that the chitosan particles in the pH adjusted mixture have dissolved completely whereas the chitosan particles in the DI water mixture have settled to the bottom. The viscosity of the pH adjusted sample is shown in FIG. 5. It can seen that the viscosity of the final solution is lot higher than the initial mixture (DI water viscosity is 1 cp) as the chitosan dissolved in DI water at low pH.

Example 2

Three slurries were prepared using sand (800 μm), polylactic acid (PLA, 150 μm), silica powder (3 μm), chitosan particles and DI water. The composition of the slurries is shown in Table 1.

TABLE 1

| Component | Slurry A1 (g) | Slurry A2 (g) | Slurry A3 (g) |
| --- | --- | --- | --- |
| Sand (800 μm) | 101.76 | 101.76 | 101.76 |
| PLA (150 μm) | 12 | 12 | 12 |
| Silica (3 μm) | 29.68 | 29.68 | 29.68 |
| DI Water | 20.8 | 20.8 | 20.8 |
| Chitosan | NA | 0.4 | 0.8 |

The slurries were aged in the oven at 121.1° C. (250° F.) for 24 hours. Slurry A1 has three phases after 24 h; a bottom layer containing a settled mixture of sand, PLA and silica powder, a middle layer of fluid containing the 3 μm silica powder and a top layer of free water. In slurries A2 and A3, not much settling is observed due to increase in solution viscosity resulting from the dissolution of chitosan particles as PLA hydrolyzes and decreases the pH.

The amount of free water on the top of the settled mixture after 24 hrs at 121.1° C. (250° F.) is measured to compare the settling rate of each of the slurries and the results are shown in Table 2 below.

TABLE 2

| Fluid | Free water (mL) |
| --- | --- |
| Slurry A1 | 15 |
| Slurry A2 | 1 |
| Slurry A3 | 2 |

The data in Table 2 shows that addition of chitosan particles to the slurry help in decreasing the settling rate of solids.

Example 3

Two slurries containing PLA, silica and DI water were prepared according to Table 3 composition. In slurry B2, chitosan polymer particles were added to reduce the settling rate of silica. The PLA particles were added to decrease the pH of the solution at high temperature so that chitosan particles can dissolve in the fluid and increase viscosity. The settling of silica in the two slurries after heating them for 24 hrs at 93.3° C. (200° F.) was analyzed. The silica in slurry B2 is settling at a much lower rate than the silica in slurry B1.

TABLE 3

| Component | Slurry B1 (g) | Slurry B2 (g) |
| --- | --- | --- |
| PLA (150 μm) | 17.7 | 17.7 |
| Silica (3 μm) | 42.9 | 42.9 |
| DI Water | 171 | 171 |
| Chitosan | 0 | 0.9 |

The amount of free water on the top of the settling mixture is shown in Table 4 below.

TABLE 4

| Fluid | Total Volume (mL) | Free Water (mL) |
| --- | --- | --- |
| Slurry B1 | 200 | 130 |
| Slurry B2 | 200 | 80 |

Example 4

One gram of ISOBAM particles are added to DI water and the pH of the fluid was increased to 12 using NaOH. The ISOBAM particles dissolved completely after 94 h at room temperature increasing the viscosity of the solution. The mixture of 1 gm of ISOBAM particles in 25 mL of DI water at pH=12 before and after dissolution of ISOBAM particles were analyzed. After 94 h the ISOBAM particles dissolved completely.

Example 5

A slurry was prepared using sand (800 μm), PGA (150 μm), PGA (8 μm), a base precursor or a pH buffer such as MgO, alkali swellable latex and water. The slurry is placed downhole and the pH of the slurry increases as the base precursor releases the base into solution. The alkali swellable latex viscosifies the solution as soon as the water becomes alkaline. The increase in viscosity reduces the settling rate of sand.

The foregoing disclosure and description of the invention is illustrative and explanatory thereof and it can be readily appreciated by those skilled in the art that various changes in the size, shape and materials, as well as in the details of the illustrated construction or combinations of the elements described herein can be made without departing from the spirit of the invention.

What is claimed is:

1. A method of treating a subterranean formation of a well bore, comprising:
   a. providing a treatment fluid comprising a fluid, proppant, and a viscosifier material, wherein the viscosifier material is inactive in a first state and is able to increase viscosity of the treatment fluid when in a second state;
   b. introducing the treatment fluid into the wellbore; and,
   c. providing a trigger able to activate the viscosifier material from first state to second state.

2. The method of claim 1, wherein the treatment fluid further comprises a degradable particulate material.

3. The method of claim 2, wherein the particulate material has a first average particle size and the degradable particulate material has a second average particle size, wherein the second average particle size is between three to twenty times smaller than the first average particle size.

4. The method of claim 3, wherein the degradable particulate material has further an amount of particulates having a third average particle size, wherein the third average particle size is between three to twenty times smaller than the second average particle size.

5. The method of claim 4, wherein the third average particle size is between five to ten times smaller than the second average particle size.

6. The method of claim 3, wherein the second average particle size is between five to ten times smaller than the first average particle size.

7. The method of claim 1, wherein the trigger is pH.

8. The method of claim 7, wherein the viscosifier material is an acid soluble polymer which increases viscosity of the treatment fluid when in acid pH.

9. The method of claim 8, wherein the treatment fluid further comprises an acid precursor and the step of providing the trigger is done by releasing acid from the acid precursor.

10. The method of claim 9, wherein the acid precursor is encapsulated.

11. The method of claim 9, wherein the treatment fluid further comprises a degradable particulate material and the acid precursor is the degradable particulate material.

12. The method of claim 8, wherein the treatment fluid further comprises an acid and the step of providing the trigger is done by releasing acid.

13. The method of claim 12, wherein the acid is encapsulated.

14. The method of claim 8, wherein the acid soluble polymer is chitosan, chitosan derivative, polyimide, copolymer of vinyl pyridine, copolymer of acrylic and/or methacrylic acid or a mixture thereof.

15. The method of claim 7, wherein the viscosifier material is a base soluble polymer which increases viscosity of the treatment fluid when in base pH.

16. The method of claim 15, wherein the treatment fluid further comprises a base precursor and the step of providing the trigger is done by releasing base from the base precursor.

17. The method of claim 16, wherein the base precursor is encapsulated.

18. The method of claim 15, wherein the treatment fluid further comprises a base and the step of providing the trigger is done by releasing base.

19. The method of claim 18, wherein the base is encapsulated.

20. The method of claim 15, wherein the base soluble polymer is copolymer containing maleic anhydride, alkali swellable latex or a mixture thereof.

21. The method of claim 1, wherein the fluid is a carrier fluid.

22. The method of claim 1, wherein the trigger is temperature.

23. A method of reducing the settling rate of a treatment fluid with proppant comprising:
 a. providing the treatment fluid comprising the proppant;
 b. providing a viscosifier material in the treatment fluid;
 c. providing a trigger able to activate the viscosifier material to increase viscosity of the treatment fluid such that the settling rate of the proppant in the treatment fluid is reduced.

24. The method of claim 23, wherein the trigger is pH.

25. The method of claim 24, wherein the viscosifier material is an acid soluble polymer which increases viscosity of the treatment fluid when in acid pH.

26. The method of claim 25, wherein the treatment fluid further comprises an acid precursor and the step of providing the trigger is done by releasing acid from the acid precursor.

27. The method of claim 26, wherein the acid precursor is encapsulated.

28. The method of claim 25, wherein the treatment fluid further comprises an acid and the step of providing the trigger is done by releasing acid.

29. The method of claim 28, wherein the acid is encapsulated.

30. The method of claim 24, wherein the viscosifier material is a base soluble polymer which increases viscosity of the treatment fluid when in base pH.

31. The method of claim 30, wherein the treatment fluid further comprises a base precursor and the step of providing the trigger is done by releasing base from the base precursor.

32. The method of claim 31, wherein the base precursor is encapsulated.

33. The method of claim 30, wherein the treatment fluid further comprises a base and the step of providing the trigger is done by releasing base.

34. The method of claim 33, wherein the base is encapsulated.

35. The method of claim 23, wherein the trigger is temperature.

36. A method of avoiding the settling rate of a treatment fluid with a particulate material and a degradable material comprising:
 a. providing the treatment fluid comprising the particulate material and the degradable material;
 b. providing a viscosifier material in the treatment fluid;
 c. providing a trigger able to activate the viscosifier material to increase viscosity of the treatment fluid when the degradable material dissolved in the treatment fluid, such that the settling rate of the particulate material in the treatment fluid is unchanged.

37. The method of claim 36, wherein the trigger is pH.

38. The method of claim 37, wherein the viscosifier material is an acid soluble polymer which increases viscosity of the treatment fluid when in acid pH.

39. The method of claim 38, wherein the treatment fluid further comprises an acid precursor and the step of providing the trigger is done by releasing acid from the acid precursor.

40. The method of claim 39, wherein the acid precursor is embodied in the degradable material.

41. The method of claim 40, wherein the degradable material is polylactic acid.

42. The method of claim 39, wherein the acid precursor is encapsulated.

43. The method of claim 38, wherein the treatment fluid further comprises an acid and the step of providing the trigger is done by releasing acid.

44. The method of claim 43, wherein the acid is encapsulated.

45. The method of claim 37, wherein the viscosifier material is a base soluble polymer which increases viscosity of the treatment fluid when in base pH.

46. The method of claim 45, wherein the treatment fluid further comprises a base and the step of providing the trigger is done by releasing base.

47. The method of claim 46, wherein the base is encapsulated.

48. The method of claim 45, wherein the treatment fluid further comprises a base precursor and the step of providing the trigger is done by releasing base from the base precursor.

49. The method of claim 48, wherein the base precursor is encapsulated.

50. The method of claim 36, wherein the trigger is temperature.

51. The method of claim 36, wherein the particulate material is proppant.

* * * * *